UNITED STATES PATENT OFFICE 2,527,833

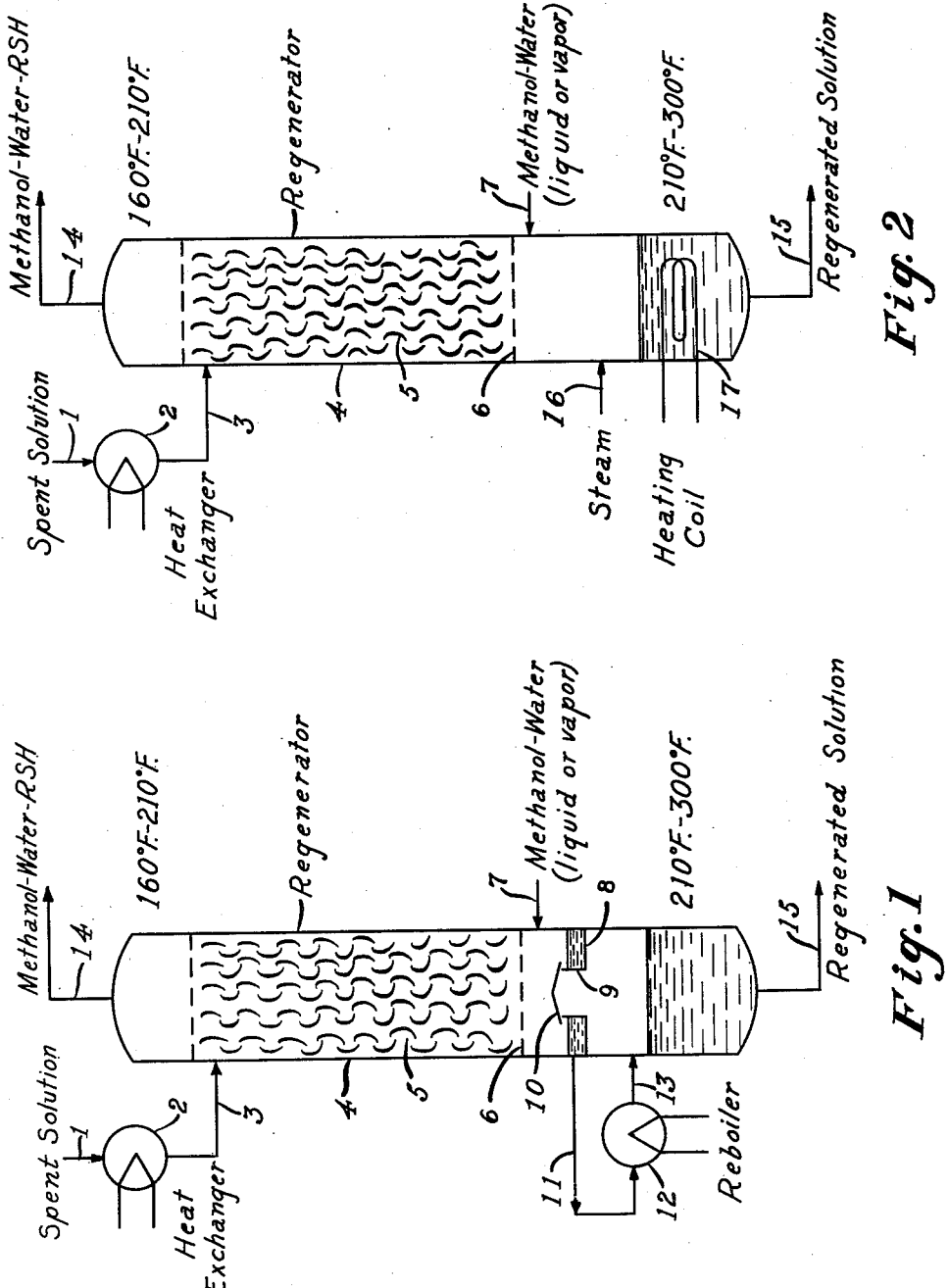

REGENERATION OF SPENT AQUEOUS ALCOHOLIC CAUSTIC SOLUTIONS CONTAINING MERCAPTIDES

James H. McCullough, Philadelphia, Pa., assignor to The Atlantic Refining Company, Philadelphia, Pa., a corporation of Pennsylvania Application September 28, 1949, Serial No. 118,342

7 Claims. (Cl. 252—192)

The present invention relates to a method of regenerating spent aqueous alcoholic solutions of caustic alkalis which have been employed in the desulfurization of hydrocarbon oils and thus contain substantial quantities of mercaptides.

More particularly, this invention provides a method for reducing corrosion of equipment in the regeneration of a spent aqueous alcoholic caustic solution containing mercaptides, the caustic content of the original solution being of the order of 40% to 60% by weight, on an alcohol-free basis. Such regeneration is accomplished by intimately contacting the spent solution with steam and alcohol vapor at temperatures sufficiently elevated to strip out mercaptans, water, and alcohol as vapors and to produce a residue, an aqueous solution containing 40% to 60% by weight of caustic and 0.1% to 5% by weight of alcohol. The stripping operation is accomplished with steam and alcohol vapors at a temperature which is 5° F. to 50° F. below the boiling point of an aqueous solution containing a corresponding concentration of caustic. By effecting stripping at temperatures substantially lower than would ordinarily be required, the corrosion of iron, steel, or alloys employed in the construction of regeneration equipment is markedly reduced, particularly in those sections of the regenerator where high caustic concentrations are encountered.

The present invention may be further understood with reference to the accompanying drawing, in which Figures 1 and 2 show, respectively, two modifications of regenerators which may be employed in carrying out the method of this invention.

Referring to Figure 1, a spent aqueous caustic-methanol solution containing up to 2000 mg. sulfur as mercaptan sulfur per 100 cc. of solution is passed through pipe 1 into preheater or heat exchanger 2 wherein the temperature of the solution is raised by indirect heat exchange to 160° F.–200° F. The original solution, before use in extracting mercaptans from hydrocarbon oils (particularly gasoline), had a composition within the limits of 70–45 weight per cent of 40% aqueous caustic and 15–30 weight per cent methanol to 30–55 weight per cent of 60% aqueous caustic and 70–45 weight per cent methanol. The preheated, spent solution is delivered by pipe 3 to the regenerator 4 and is distributed over the packing 5 which may constitute any suitable material such as carbon shapes or fragments, supported upon a grid 6. The spent solution, in passing downward over the packing, is subjected to the action of steam and methanol vapors introduced into the regenerator below grid 6. For example, 100% methanol or methanol-water mixtures containing as little as 10% methanol, may be introduced as liquid or vapor through pipe 7 at a point above the level of liquid on the tray 8. Tray 8 is provided with a vapor uptake 9 and a cap 10 so constructed as to permit free upflow of vapors while preventing direct downflow of solution from packing 5. Liquid on tray 8, comprising aqueous caustic solution and methanol, is continuously drawn off by pipe 11 and passed through reboiler 12 wherein heat is supplied by indirect exchange, and the resulting vapors, mostly steam and methanol, are returned by pipe 13 to regenerator 4 below tray 8, together with aqueous caustic solution containing an equilibrium quantity of methanol. The vapor passes through uptake 9, and together with the methanol or methanol-water vapors supplied through pipe 7, intimately contacts the spent solution flowing countercurrently downward over packing 5. Due to the combined action of the heat and the vapors, the mercaptides in the spent solution are decomposed liberating mercaptans, and these together with methanol and steam, pass upward through the regenerator 4 and are withdrawn, as vapors, from the top of the regenerator by pipe 14 at a temperature between 160° F. and 210° F. The methanol-water-mercaptan vapors are condensed and thereafter treated for the separation and recovery of the methanol. The regenerated solution accumulating in the bottom of the regenerator, at a temperature between 210° F. and 300° F., is withdrawn by pipe 15, cooled, and may be returned to make up additional mercaptan extraction reagent. Such regenerated solution comprises aqueous caustic containing from 40% to 60% by weight of caustic, 0.1% to 5% by weight of methanol, and not more than 1200 mg. of sulfur as mercaptan sulfur per 100 cc. of solution. In general, the quantity of stripping vapor (steam and methanol) required for satisfactory stripping ranges between 100 and 1000 lbs. per barrel of regenerated solution. By regulating the rate of charge of spent solution, and of the stripping steam and methanol, and by maintaining from 0.1% to 5% by weight of methanol in the regenerated solution in the bottom of the regenerator, it is possible to reduce the temperature of the solution in the bottom of the regenerator from 5° F. to 50° F. below that of an aqueous caustic solution of corresponding caustic content without adversely affecting stripping of mercaptans, while simultaneously reducing the corrosion of equipment by hot, concentrated caustic.

With respect to that modification of the apparatus illustrated in Figure 2, the operation thereof is generally similar to that employed in the apparatus of Figure 1, the main difference being in the use of an internal heating coil in the bottom of the regenerator in lieu of the external reboiler of Figure 1, and the elimination of tray 8.

Referring to Figure 2, the spent aqueous caustic-methanol solution containing mercaptides is passed from pipe 1 to heat exchanger 2 and preheated to 160° F.–210° F. The preheated solution is then introduced by pipe 3 into regenerator 4 and descends over packing 5 countercurrent to methanol or methanol-water vapors from pipe 7 and steam from pipe 16. Additional heat is supplied from heating coil 17, and the spent solution, by the combined action of the heat and of the stripping media, i. e., steam and methanol, is relieved of a substantial proportion of its mercaptan content as well as its methanol content, these components being taken off as vapors through pipe 14, together with steam. All of the methanol entering the regenerator in the spent solution and all of the methanol introduced as stripping medium is taken overhead as vapor except that which remains in the regenerated solution drawn from the bottom of the regenerator by pipe 15. In addition, an amount of water is taken overhead equal to the amount supplied by the stripping vapor, where a constant aqueous caustic strength is maintained. A material balance based on a controlled quantity and composition of spent solution and stripping vapor determines the composition of the vapor taken overhead. Control of the regenerator top temperature and vapor composition of the stripping medium prevents dehydration by removal of water from the regenerator and maintains the desired amount of methanol in the regenerated aqueous caustic solution in the bottom of the regenerator. The regenerator top temperature may be controlled by the amount of preheating of the spent solution to be regenerated.

The effect of the presence of various amounts of methanol upon the boiling point of various concentrations of aqueous caustic solutions (sodium hydroxide) is shown in the following table, the temperatures being given in °F. at atmospheric pressure.

| Weight Per Cent Methanol | Boiling Point | | | | | | |
|---|---|---|---|---|---|---|---|
| | 0 | 1 | 2 | 3 | 4 | 5 | 10 |
| 40 Weight Per Cent NaOH | 265 | 247 | 238 | 231 | 225 | 221 | 209 |
| 45 Weight Per Cent NaOH | 277 | 255 | 245 | 238 | 232 | 228 | 214 |
| 47 Weight Per Cent NaOH | 282 | 259 | 249 | 241 | 235 | 231 | 217 |
| 50 Weight Per Cent NaOH | 290 | 265 | 254 | 246 | 239 | 235 | 220 |
| 53 Weight Per Cent NaOH | 298 | 271 | 259 | 250 | 244 | 240 | 224 |
| 57 Weight Per Cent NaOH | 309 | 280 | 266 | 258 | 251 | 246 | 229 |
| 60 Weight Per Cent NaOH | 320 | 286 | 272 | 263 | 256 | 251 | 233 |

From the above data, it will be seen that a substantial reduction in boiling point of concentrated aqueous caustic solutions is obtained by maintaining in the solutions, minor amounts of alcohol. This permits regeneration at reduced temperatures, and consequently a reduction in corrosion of regeneration equipment. However, it is undesirable to employ more than 5% by weight of alcohol in the concentrated aqueous caustic, since higher percentages such as 10%, 20%, etc., although giving a greater decrease in boiling point, adversely affect the regeneration. In other words, with more than 5% alcohol in the regenerated aqueous caustic bottoms, the stripping out of mercaptans is rendered more difficult due to the lower temperatures employed and the fact that increased amounts of alcohol in the aqueous caustic increase the solubility or decrease the hydrolysis of mercaptides. If 10% or 20% of alcohol was maintained in the aqueous caustic bottoms in the regenerator, considerably more stripping vapor (steam and alcohol) would be required to effect the same degree of stripping as could be obtained by maintaining 5% or less of alcohol in the caustic bottoms. It is therefore desirable to employ from 0.1% to 5%, and preferably 1% to 1.5% of alcohol in the regenerated aqueous caustic solutions withdrawn from the regenerator.

In the stripping of spent aqueous caustic-methanol solutions containing mercaptides, the composition of the stripping vapor to obtain equilibrium is given in the following table, as is the composition of the liquid in equilibrium, i. e., the mole per cent methanol in the vapor versus the mole per cent methanol in the liquid for caustic concentrations (NaOH) of 40%, 47%, and 60% by weight.

| | Mole Per Cent Methanol in Vapor | | |
|---|---|---|---|
| Caustic Concentration | 40% | 47% | 60% |
| Mole Per Cent Methanol in Liquid: | | | |
| 0.1 | 4.4 | 6.5 | 13.0 |
| 0.3 | 12.0 | 17.0 | 32.0 |
| 0.5 | 18.0 | 25.5 | 45.0 |
| 0.7 | 23.5 | 32.5 | 55.0 |
| 1.0 | 30.5 | 41.0 | 64.0 |
| 2.0 | 47.0 | 58.0 | 74.0 |
| 3.0 | 58.0 | 66.0 | 80.0 |
| 4.0 | 63.0 | 70.0 | 82.0 |
| 5.0 | 67.0 | 74.0 | 84.0 |

In the following table is shown, by way of example, the relations between the regenerator bottom temperature, the weight per cent methanol in the stripping vapor, and the weight per cent methanol in the regenerator bottoms (regenerated aqueous caustic solution), when a spent solution comprising 50 weight per cent methanol and 50 weight per cent of 53% aqueous NaOH and containing 1400 mg. of sulfur as mercaptan sulfur per 100 cc. is regenerated on plant scale at a regenerator top temperature of 164° F. using 390 lbs. of stripping vapor per barrel of regenerated solution, such regenerated solution having an aqueous caustic strength of 53% and containing 500 mg. of sulfur as mercaptan sulfur per 100 cc.

| Regenerator Bottom Temperature, °F. | Wt. Per Cent Methanol in Stripping Vapors | Wt. Per Cent Methanol in Regenerator Bottoms |
|---|---|---|
| 240 | 87.4 | 1.8 |
| 250 | 89.2 | 1.3 |
| 260 | 91.0 | 0.9 |
| 270 | 92.8 | 0.5 |
| 280 | 94.5 | 0.2 |
| 290 | 96.4 | 0.1 |
| 300 | 98.2 | 0.05 |

While the present invention has been described particularly with reference to the regeneration of spent aqueous caustic-methanol solutions containing mercaptides, it is not limited thereto but may be applied in the regeneration of other spent aqueous alcoholic caustic solutions containing mercaptides, in which the alcohol may be ethyl, propyl, or isopropyl, and the caustic may be potassium hydroxide in lieu of sodium hydroxide. In all cases, however, the aqueous caustic concentration in the original solution (on an alcohol-free basis) is within the range of 40–60 weight per cent.

I claim:

1. A method of regenerating a spent aqueous caustic-methanol solution containing mercaptides, said solution originally having a composition within the limits of 70-85 weight per cent of 40% aqueous caustic and 15-30 weight per cent methanol to 30-55 weight per cent of 60% aqueous caustic and 70-45 weight per cent methanol, which comprises intimately contacting said spent solution with steam and methanol at an elevated temperature sufficient to remove mercaptans, water, and methanol as vapors and to produce as a residue a regenerated aqueous caustic solution containing 40% to 60% by weight of caustic and 0.1% to 5% by weight of methanol.

2. A method of regenerating a spent aqueous caustic-methanol solution containing mercaptides, said solution originally having a composition within the limits of 70-85 weight per cent of 40% aqueous caustic and 15-30 weight per cent methanol to 30-55 weight per cent of 60% aqueous caustic and 70-45 weight per cent methanol, which comprises intimately contacting said spent solution with steam and methanol at a maximum temperature of 300° F. to remove mercaptans, water, and methanol as vapors and to produce as a residue a regenerated aqueous caustic solution containing 40% to 60% by weight of caustic and 0.1% to 5% by weight of methanol.

3. A method of regenerating a spent aqueous caustic-methanol solution containing mercaptides, said solution originally having a composition within the limits of 70-85 weight per cent of 40% aqueous caustic and 15-30 weight per cent methanol to 30-55 weight per cent of 60% aqueous caustic and 70-45 weight per cent methanol, which comprises passing said spent solution through a regeneration zone countercurrent to a stripping medium comprising steam and methanol at an elevated temperature sufficient to strip out mercaptans, water, and methanol as vapors, withdrawing said vapors from the said zone above the point of introduction of said spent solution, and withdrawing a regenerated aqueous caustic solution containing 40% to 60% by weight of caustic and 0.1% to 5% by weight of methanol from said zone below the point of introduction of said spent solution.

4. A method of regenerating a spent aqueous caustic-methanol solution containing mercaptides, said solution originally having a composition within the limits of 70-85 weight per cent of 40% aqueous caustic and 15-30 weight per cent methanol to 30-55 weight per cent of 60% aqueous caustic and 70-45 weight per cent methanol, which comprises passing said spent solution through a regeneration zone countercurrent to a stripping medium comprising steam and methanol at an elevated temperature sufficient to strip out mercaptans, water, and methanol as vapors, withdrawing said vapors from the said zone above the point of introduction of said spent solution, and withdrawing a regenerated aqueous caustic solution containing 40% to 60% by weight of caustic and 0.1% to 5% by weight of methanol from said zone below the point of introduction of said spent solution, the temperature at the point of vapor withdrawal being between 160° F. and 210° F. and at the point of regenerated caustic solution withdrawal between 210° F. and 300° F.

5. A method of regenerating a spent aqueous caustic-methanol solution containing mercaptides, said solution originally having a composition within the limits of 70-85 weight percent of 40% aqueous caustic and 15-30 weight percent methanol to 30-55 weight percent of 60% aqueous caustic and 70-45 weight percent methanol, which comprises passing said spent solution through a regeneration zone countercurrent to a stripping medium comprising steam and methanol at an elevated temperature sufficient to strip out mercaptans, water, and methanol as vapors, withdrawing said vapors from the said zone above the point of introduction of said spent solution, and withdrawing a regenerated aqueous caustic solution containing 40% to 60% by weight of caustic and 0.1% to 5% by weight of methanol from said zone below the point of introduction of said spent solution, the temperature at the point of withdrawal of the regenerated caustic solution being from 5° F. to 50° F. lower than the boiling point of an aqueous solution containing a corresponding concentration of caustic.

6. A method of regenerating a spent aqueous caustic-methanol solution containing mercaptides, said solution originally having a composition within the limits of 70-85 weight percent of 40% aqueous caustic and 15-30 weight percent methanol to 30-55 weight percent of 60% aqueous caustic and 70-45 weight percent methanol, which comprises introducing said spent solution into a regeneration zone at a point adjacent the top thereof, flowing said solution downwardly through said zone, introducing steam and methanol at a point adjacent the bottom of said zone, contacting the spent solution with the steam and methanol at a temperature sufficient to strip out mercaptans, water, and methanol as vapors, withdrawing said vapors at the top of said zone, and withdrawing a regenerated aqueous caustic solution containing 40% to 60% by weight of caustic and 0.1% to 5% by weight of methanol from the bottom of said zone.

7. A method of regenerating a spent aqueous caustic-methanol solution containing mercaptides, said solution originally having a composition within the limits of 70-85 weight percent of 40% aqueous caustic and 15-30 weight percent methanol to 30-55 weight percent of 60% aqueous caustic and 70-45 weight percent methanol, which comprises introducing said spent solution into a regeneration zone at a point adjacent the top thereof, flowing said solution downwardly through said zone, introducing steam and methanol at a point adjacent the bottom of said zone, contacting the spent solution with the steam and methanol at a temperature sufficient to strip out mercaptans, water, and methanol as vapors, withdrawing said vapors at the top of said zone, and withdrawing a regenerated aqueous caustic solution containing 40% to 60% by weight of caustic and 1.0% to 1.5% by weight of methanol from the bottom of said zone.

JAMES H. McCULLOUGH.

REFERENCES CITED

The following references are of record in the file of this patent:

UNITED STATES PATENTS

| Number | Name | Date |
|---|---|---|
| 2,228,295 | Yabroff | Jan. 14, 1941 |
| 2,309,651 | McCullough et al. | Feb. 2, 1943 |
| 2,309,653 | Leum et al. | Feb. 2, 1943 |
| 2,345,449 | Birkhimer | Mar. 28, 1944 |
| 2,354,974 | Harnsberger | Aug. 1, 1944 |
| 2,437,348 | Brown et al. | Mar. 9, 1948 |